May 28, 1935.　　　　F. P. HEID　　　　2,003,188
GAUGE
Filed May 12, 1934　　4 Sheets-Sheet 1

Frank P. Heid, INVENTOR
BY Victor J. Evans & Co.
ATTORNEY

May 28, 1935.  F. P. HEID  2,003,188
GAUGE
Filed May 12, 1934  4 Sheets-Sheet 2
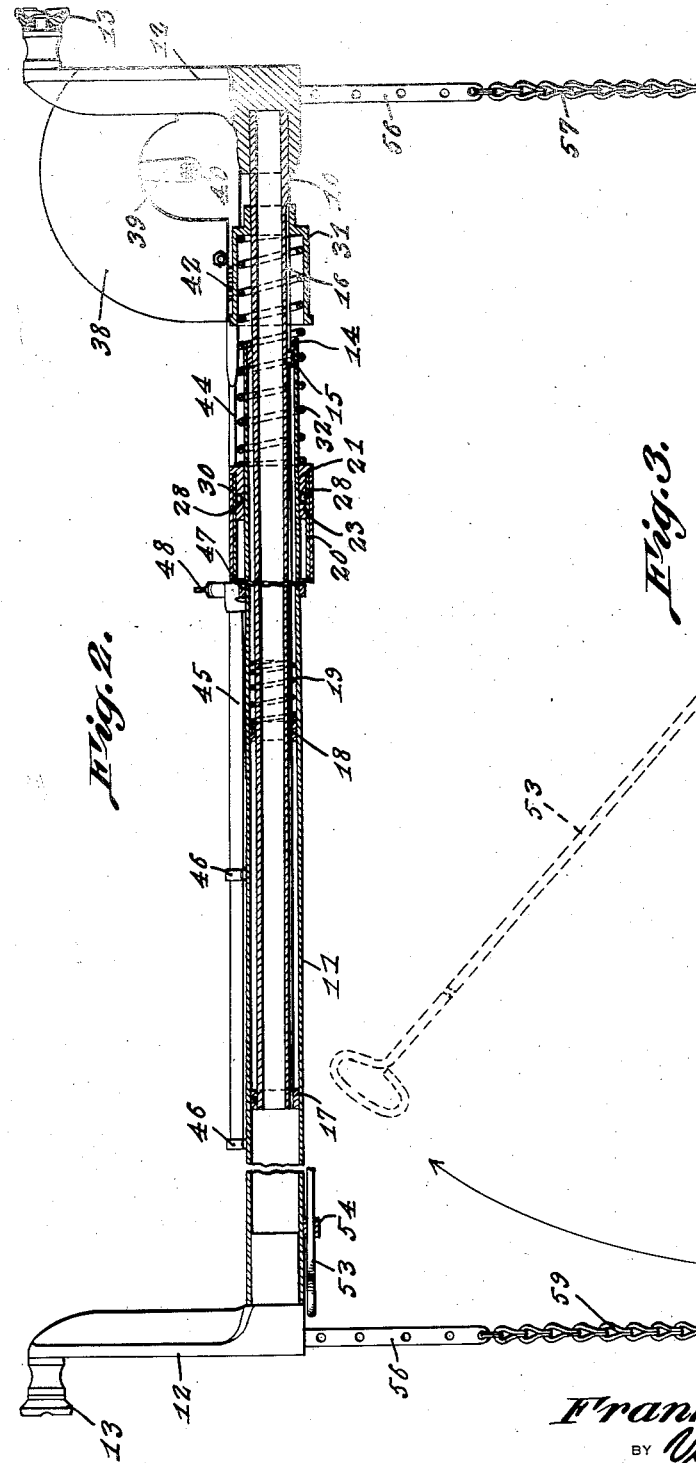
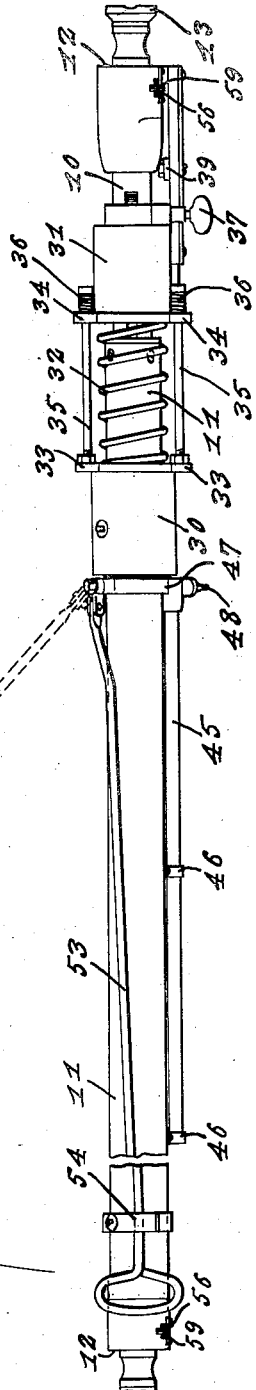
Frank P. Heid, INVENTOR
BY Victor J. Evans & Co.
ATTORNEY May 28, 1935.  F. P. HEID  2,003,188
GAUGE
Filed May 12, 1934  4 Sheets-Sheet 3
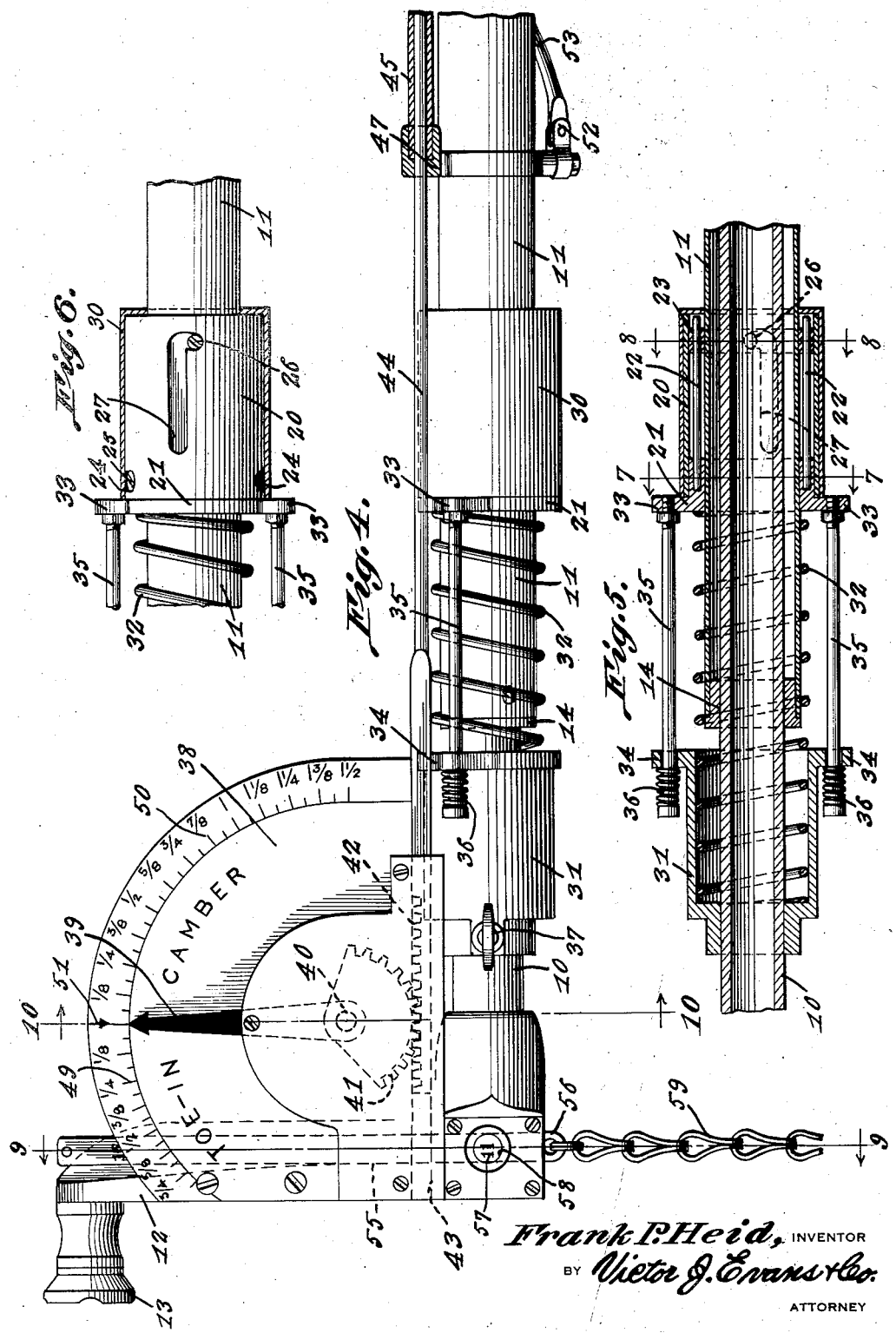
Frank P. Heid, INVENTOR
BY Victor J. Evans & Co.
ATTORNEY May 28, 1935.  F. P. HEID  2,003,188
GAUGE
Filed May 12, 1934  4 Sheets-Sheet 4
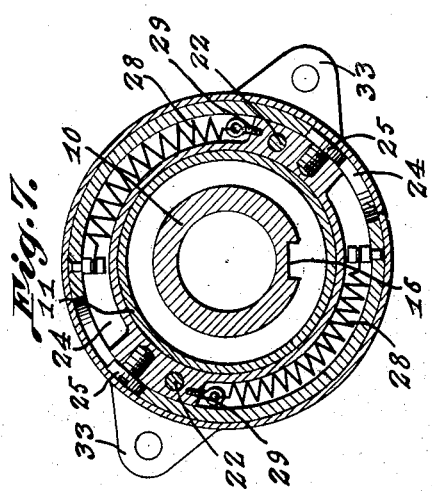
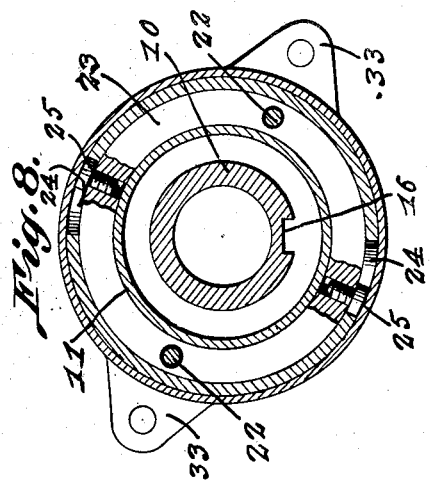
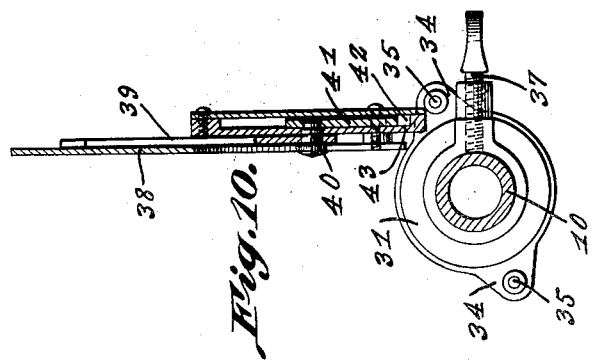
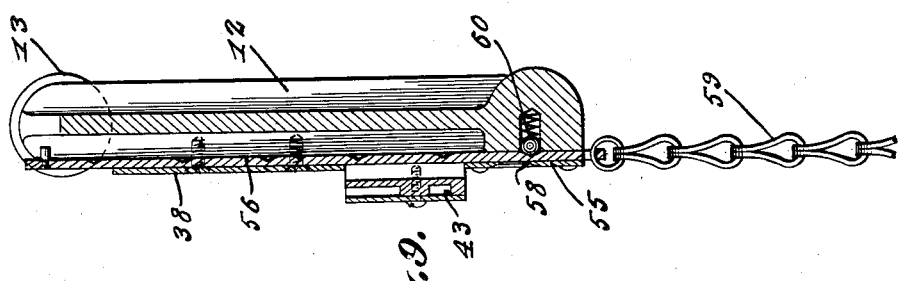
Frank P. Heid, INVENTOR
BY Victor J. Evans & Co.
ATTORNEY Patented May 28, 1935

2,003,188

UNITED STATES PATENT OFFICE 2,003,188

GAUGE

Frank P. Heid, Erie, Pa.

Application March 12, 1934, Serial No. 715,186

5 Claims. (Cl. 33—203)

The invention relates to a gauge and more especially to vehicle wheel aligning gauges.

The primary object of the invention is the provision of a gauge of this character, wherein the same is designed to measure the alignment of vehicle wheels, either the front or rear wheels of such vehicle, and in the use of the said gauge at the front wheels of the vehicle there can be measured the toe-in or camber, while in use with the rear wheels the parallelism of these can be determined.

Another object of the invention is the provision of a gauge of this character, wherein it can be held between the wheels of the vehicle on the tires in front of the axis, with the contact points of the gauge on the tires at a height equal to the distance from the base upon which the wheels rest to the center of said wheels and can be transferred to this same height at the rear of the axis without removing the gauge from the wheels by having the vehicle travel forward and at the same time tilting the gauge so that it will clear the floor, as well as equipment of the vehicle adjacent to the wheels, and in this it is possible to measure the toe-in of the wheels at the best possible position on the same, which is a straight line through the center of the wheels parallel with the base.

A further object of the invention is the provision of a gauge of this character, wherein the construction thereof is novel in form and is susceptible of portability and ease of adjustment, as well as permitting convenient reading when in use, so that measurement either of the toe-in or camber position of the wheels may be had with accuracy.

A still further object of the invention is the provision of a gauge of this character, wherein a spring adjusting device is embodied therewith which enables the gauge to be applied with rapidity and also to maintain the same spring pressure against the tires of the wheels regardless of the distance between the tires and in this manner holding the gauge between the wheels while the measurements are being had.

A still further object of the invention is the provision of a gauge of this character which is comparatively simple in construction, thoroughly reliable and efficient in its purpose, strong, durable, convenient for application irrespective of the width between the wheels of the vehicle, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 2 is a fragmentary vertical longitudinal sectional view through the gauge, the same being reversed with respect to that position shown in Figure 1.

Figure 3 is a bottom plan view showing by full lines the handle of the gauge inactive and by dotted lines in an active position.

Figure 4 is a fragmentary enlarged front elevation of the gauge partly in section.

Figure 5 is a fragmentary longitudinal sectional view through the pressure spring adjusting device for the gauge.

Figure 6 is a detail side elevation of the said device partly in section.

Figure 7 is an enlarged sectional view on the line 7—7 of Figure 5 looking in the direction of the arrows.

Figure 8 is a sectional view on the line 8—8 of Figure 5 looking in the direction of the arrows.

Figure 9 is a sectional view on the line 9—9 of Figure 4 looking in the direction of the arrows.

Figure 10 is a sectional view on the line 10—10 of Figure 4 looking in the direction of arrows.

Similar reference characters indicate corresponding parts throughout the several views in the drawings.

Figure 1:
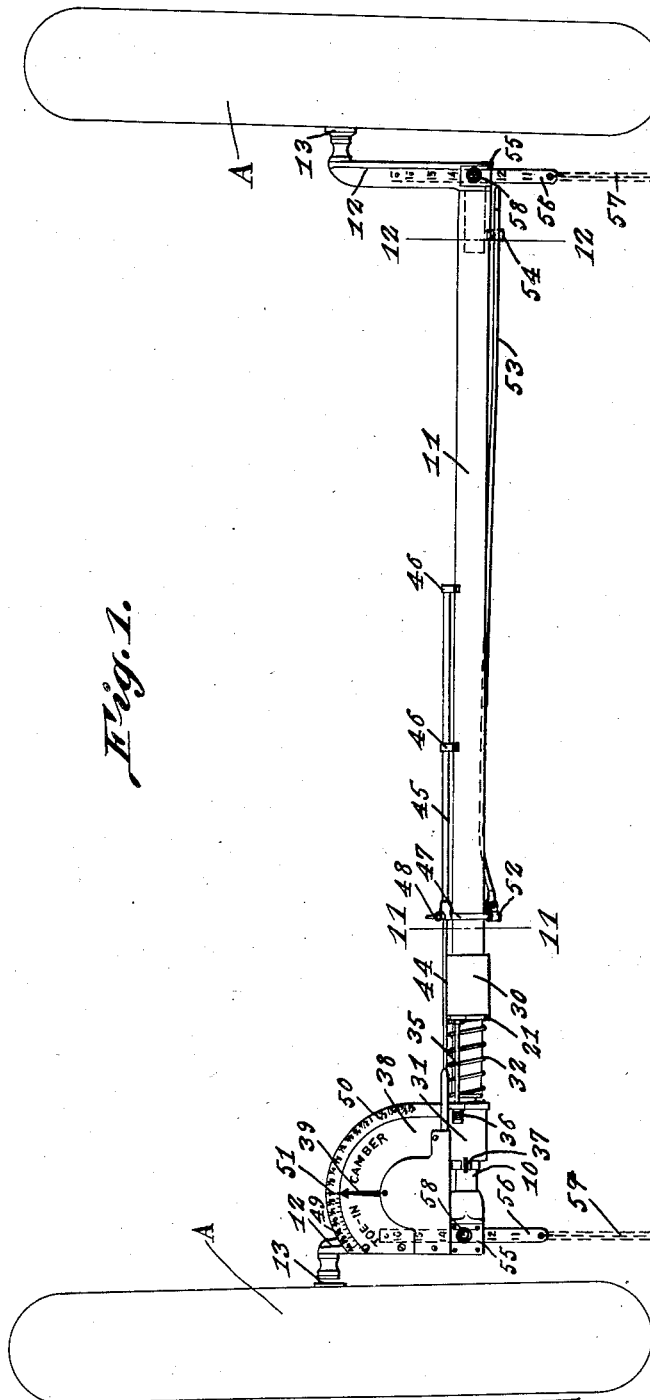
Figure 1 is an elevation of the gauge constructed in accordance with the invention and shown applied to the front wheels of a vehicle.
Figure 12:
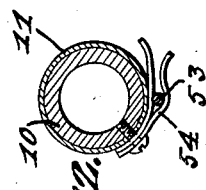
Figure 12 is a sectional view on the line 12—12 of Figure 1.
Figure 11:
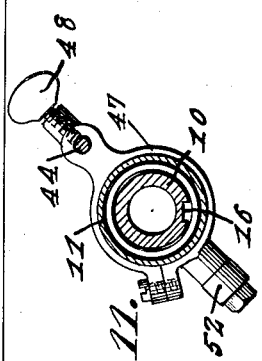
Figure 11 is a sectional view on the line 11—11 of Figure 1.

Referring to the drawings in detail, A designates generally a pair of vehicle wheels of the pneumatic tired type for their measurement as to toe-in or camber and which are shown merely to illustrate the application of the gauge constituting the present invention and hereinafter fully described.

The gauge comprises inside and outside telescopically fitted relatively slidable tubes 10 and 11, respectively, these at their outer ends being fitted with arms 12 disposed at right angles to said tubes and the free ends of such arms carry laterally offset swiveled contact heads 13 adapted for engagement with the tires of the wheels A when the gauge is in use.

The outside tube 11, at its inner end, has secured therein a bushing 14 formed with a key 15 engaging a keyway 16 longitudinally disposed in the inside tube 10, so that these tubes in their telescopic assembly are free for sliding movements with respect to each other but will be prevented from relative turning movements one within the other, and in this manner the arms 12 will be parallel with each other. On the inner end of the inside tube 10 is a guide collar 17, while intermediate with respect to the bushing 14 and said collar 17 is the stop collar 18, the same being carried by said inside tube 10, and working against this collar 18 housed by the outside tube 11 is a coiled cushioning spring 19 which coacts with the bushing 14 when the inside tube 10 is being extended to its fullest degree to without the outside tube 11.

Carried by the outside tube 11 is a spring adjusting device which comprises a sleeve 20 carrying at one end a collar 21 provided with guide pins 22 slidable through an annular shoulder 23 fast to the outside tube 11 externally thereof, the sleeve being formed with diametrically opposed slots 24, these being circumferentially disposed and accommodating therein stop lugs 25 carried by the collar 21 so that the sleeve can be partially rotated with respect to the collar 21 for the latching and unlatching of said collar, this being had through a keeper lug 26 upon the annular shoulder 23 and the elongated bayonet slots 27 receiving said keeper lug 26, as should be apparent. When the sleeve 20 is unlatched it can be longitudinally shifted for the moving of the collar 21 in a like direction.

Between the outside tube 11 and the sleeve 20 are the opposed coiled tensioning springs 28, these being connected with the offsets 29 of the annular shoulder 23 and with the said sleeve 20 so as to urge the latter in a latching direction for the latching of the lug 26 in the offset of the elongated slots 27 to maintain the collar 21 in a locked position upon the outside tube 11. The sleeve 20 is contained within a cylindrical housing 30 made fast thereto in any suitable manner.

Slidably fitted upon the inside tube 10 is a bearing cap or cup 31 for a coiled expansion spring 32, the same being seated against the collar 21 which has the diametrically opposed ears 33 and likewise the said cap or cup has the diametrically opposed ears 34, the ears 33 being fitted with guide tie rods 35 loosely passed through the ears 34. The rods 35 carry at their outer ends coiled expansion springs 36, these working against the ears 34 on the cap or cup 31 and operating counter to the spring 32. The bearing cap or cup 31 carries a set screw 37 which engages with the inside tube 10 to lock said cap or cup therewith. On the release of the screw 37 the inside tube 10 can be adjusted by the sliding of the same with relation to the outside tube 11. When the screw 37 is tightened or engaged with the inside tube 10 the same is placed under tension by the springs 32 and 36 when pressure is applied to said inside tube. When the sleeve 20 is unlatched from the lug 26 and moved in one direction the inside tube 10, by reason of the engagement of the screw 37 therewith as carried by the cap or cup 31, will be caused to move with said sleeve and thus decrease the extent of the gauge for the setting of said gauge in conformity with the width between the wheels A, without any tension action of the spring 32 upon the gauge. On reversely shifting the sleeve 20 for the latching thereof with the latching lug 26 the spring 32 will then exert a tension upon the inside and outside tubes 10 and 11 and thus placing pressure contact of the heads 13 with the wheels A, as should be apparent.

Suitably mounted upon the arm 12 carried at the outer end of the inside tube 10 is a segmental-shaped dial 38 to be traversed by a pointer or indicator hand 39, pivoted at 40 for swinging movement, the pivoted end of this pointer or hand being formed with a toothed segment 41 meshing with a toothed rack 42 slidable in a guide 43 and formed with an actuator rod 44 the same being adjustably fitted in a barrel 45 stationarily mounted upon the outside tube 11 by the series of brackets 46 and 47, the bracket 47 being provided with a set screw 48 for engaging the rod 44 for the making fast of said rod under adjustment thereof in the barrel 45. The dial 38 carries the toe-in degree scale 49 and the camber scale 50 at opposite sides of the neutral or zero marking 51 thereon and with which scales the pointer or hand 39 cooperates. It should be apparent that the pointer or hand 39 can be manually set at neutral or zero mark 51 by manual adjustment of the actuator rod 44 when releasing the screw 48.

The bracket 47, through the medium of a universal joint 52, has connected thereto a handle 53, the same being normally retained in a spring keeper 54 on the outside tube 11, but is releasable from this keeper for the manual handling of the gauge when set to the wheels A for measurement of the toe-in or camber thereof.

Provided at the arms 12 are guides 55 for measuring bars 56, each provided with an inch scale 57, its digits being visible through a reading aperture 58 in the face plate of said guide 55. The lower ends of the measuring bars 56 carry flexible or chain-like extensions 59 and the purpose of these bars with their extensions is to determine the distance between the base or point of rest of the wheels A to the center of such wheels so as to correctly position the gauge on the wheels A when testing the alignment of the latter or the toe-in or camber positions thereof.

In the use of the gauge the tubes 10 and 11 are adjusted with relation to each other until the contact heads 13 can lie between the wheels A, it being understood, of course, that the sleeve 20 is unlatched and moved in a direction to have the said heads between the wheels in close relation thereto, then the sleeve 20 is reversely moved for the latching thereof, which places pressure on the heads 13 when contacting with the tires of the wheels A by the tension of the spring 32. Then the pointer or hand 39 is manually set to neutral or zero mark 51 on the dial 38 and its rod 44 made fast in the barrel 45, it being understood that initially the gauge is set forwardly of the axis of the wheels A and in longitudinal alignment with the center of said wheels. Thereafter, the vehicle is moved forwardly and the gauge is carried around with the wheels, the handle 53 being utilized to regulate the disposition of the gauge during this forward movement of the vehicle to avoid the gauge contacting with the foundation or ground or with the axle or adjacent parts of the vehicle. As soon as the gauge reaches the point which is at substantially the same height as the initial position but rearwardly of the axis of the wheels A, the vehicle is stopped. The position of the pointer or hand 39 with relation to either scale 49 or 50 will indicate the alignment or disalignment of said wheels.

The scales on the gauge provide means for accurately measuring the distance between the wheels at different positions so that any existing inaccuracy of alignment may be corrected visibly and readily.

The gauge, by reason of its assembly, is adaptable for a wide range of adjustment and can be placed in position for use with dispatch and assures accuracy in aligning the wheels of a vehicle, either for toe-in or camber.

The bars 56 have engageable therewith spring pressed friction ball latches 60 which maintain said bars in their adjusted position in the guides 55.

An essential feature of the gauge is that it can be suspended between the wheels in front of the axle of the vehicle with the contact points of the gauge on the tires at a height equal to the distance from the base to center of wheels and can be transferred from this position to a position at the rear of the axle to this same height without removing the gauge from the wheels. Furthermore, the gauge can be tilted so that it can be transferred from the front of axis to rear of axis without removing from wheels.

What is claimed is:

1. A gauge of the kind described comprising relatively shiftable tubes telescopically fitting each other, aligned arms on the outer ends of said tubes, swiveled heads carried by said arms, a sleeve slidable on one of said tubes, a cap adjustably fixed to the other tube, tie rods fixed with the sleeve and having loose connections with the cap, a coiled tensioning spring arranged between the sleeve and said cap, means between the sleeve and the tube carrying the same for varying the tension of said spring, and indicator means operative by displacement of the tubes with relation to each other when applied to opposed vehicle wheels and on the turning thereof.

2. A gauge of the kind described comprising relatively shiftable tubes telescopically fitting each other, aligned arms on the outer ends of said tubes, swiveled heads carried by said arms, a sleeve slidable on one of said tubes, a cap adjustably fixed to the other tube, tie rods fixed with the sleeve and having loose connections with the cap, a coiled tensioning spring arranged between the sleeve and said cap, means between the sleeve and the tube carrying the same for varying the tension of said spring, indicator means operative by displacement of the tubes with relation to each other when applied to opposed vehicle wheels and on the turning thereof, and means for tensioning the tie rod connections with said cap.

3. A gauge of the kind described comprising relatively shiftable tubes telescopically fitting each other, aligned arms on the outer ends of said tubes, swiveled heads carried by said arms, a sleeve slidable on one of said tubes, a cap adjustably fixed to the other tube, tie rods fixed with the sleeve and having loose connections with the cap, a coiled tensioning spring arranged between the sleeve and said cap, means between the sleeve and the tube carrying the same for varying the tension of said spring, indicator means operative by displacement of the tubes with relation to each other when applied to opposed vehicle wheels and on the turning thereof, means for tensioning the tie rod connections with said cap, means carried by the arms for determining the horizontal elevation of said tubes with respect to a point of rest of the wheels, and means permitting the adjustment of the tube carrying the cap relative to the other tube.

4. A gauge of the kind described comprising relatively shiftable tubes telescopically fitting each other, aligned arms on the outer ends of said tubes, swiveled heads carried by said arms, a sleeve slidable on one of said tubes, a cap adjustably fixed to the other tube, tie rods fixed with the sleeve and having loose connections with the cap, a coiled tensioning spring arranged between the sleeve and said cap, means between the sleeve and the tube carrying the same for varying the tension of said spring, indicator means operative by displacement of the tubes with relation to each other when applied to opposed vehicle wheels and on the turning thereof, means for tensioning the tie rod connections with said cap, means carried by the arms for determining the horizontal elevation of said tubes with respect to a point of rest of the wheels, means permitting the adjustment of the tube carrying the cap relative to the other tube, and means for tensioning the sleeve for urging the same in latching relation to the tube carrying the same.

5. A gauge of the kind described comprising relatively shiftable tubes telescopically fitting each other, aligned arms on the outer ends of said tubes, swiveled heads carried by said arms, a sleeve slidable on one of said tubes, a cap adjustably fixed to the other tube, tie rods fixed with the sleeve and having loose connections with the cap, a coiled tensioning spring arranged between the sleeve and said cap, means between the sleeve and the tube carrying the same for varying the tension of said spring, indicator means operative by displacement of the tubes with relation to each other when applied to opposed vehicle wheels and on the turning thereof, means for tensioning the tie rod connections with said cap, means carried by the arms for determining the horizontal elevation of said tubes with respect to a point of rest of the wheels, means permitting the adjustment of the tube carrying the cap relative to the other tube, means for tensioning the sleeve for urging the same in latching relation to the tube carrying the same, and a scale dial and movable pointer included in said indicator means.

FRANK P. HEID.